United States Patent [19]
Davis et al.
[11] 4,169,806
[45] Oct. 2, 1979

[54] AGGLOMERATION PROCESS FOR MAKING GRANULAR DETERGENTS

[75] Inventors: Jerry E. Davis; Frank J. Mueller; Gerald W. Novosel, all of Cincinnati, Ohio

[73] Assignee: The Procter & Gamble Company, Cincinnati, Ohio

[21] Appl. No.: 932,109

[22] Filed: Aug. 9, 1978

[51] Int. Cl.[2] ............ B01J 2/28; B01J 2/30; C11D 3/075; C11D 11/00

[52] U.S. Cl. ............ 252/99; 23/313 R; 23/313 AS; 252/174.21; 252/135; 252/174; 252/383; 264/117

[58] Field of Search ............ 23/313 R, 313 AS; 252/89, 99, 135, 174, 383, 384, 385; 264/117

[56] References Cited

U.S. PATENT DOCUMENTS

| | | | |
|---|---|---|---|
| 2,895,916 | 7/1959 | Milenkevich | 252/99 |
| 3,154,496 | 10/1964 | Roald | 252/99 |
| 3,154,497 | 10/1964 | Mankowich | 252/135 |
| 3,468,803 | 9/1969 | Knapp | 252/106 |
| 3,598,743 | 8/1971 | Coates | 252/99 |
| 3,609,088 | 9/1971 | Sumner | 252/99 |
| 3,620,979 | 11/1971 | Corliss | 252/385 |
| 3,625,902 | 12/1971 | Sumner | 252/99 |
| 3,630,928 | 12/1971 | Fuchs | 252/135 |
| 3,682,829 | 8/1972 | Cooper | 252/99 |
| 3,700,599 | 10/1972 | Mizuno | 252/99 |
| 3,703,470 | 11/1972 | Brennan | 252/99 |
| 3,741,904 | 6/1973 | Christensen | 252/99 |
| 3,789,002 | 1/1974 | Weber | 252/99 |
| 3,816,320 | 6/1974 | Corliss | 252/99 |
| 3,888,781 | 6/1975 | Kingry | 252/99 |
| 3,933,670 | 1/1976 | Brill | 252/99 |
| 3,936,386 | 2/1976 | Corliss | 252/99 |
| 4,077,897 | 3/1978 | Gault | 252/99 |

*Primary Examiner*—Dennis L. Albrecht
*Attorney, Agent, or Firm*—Edmund F. Gebhardt; Thomas H. O'Flaherty; Richard C. Nitte

[57] ABSTRACT

Agglomerated granular detergent compositions containing at least about 10% sodium tripolyphosphate on an anhydrous basis and from 4% to 20% of an alkoxylated nonionic surfactant are prepared by spraying on or otherwise adding an aqueous sodium silicate solution as an agglomerating agent. The rate of hydration of the sodium tripolyphosphate and the degree of agglomeration of the granular detergent composition is controlled by addition of a portion of the total surfactant to one or more dry ingredients other than a major part of the sodium tripolyphosphate and the addition of another portion of the surfactant to the major part of the sodium tripolyphosphate concurrent with or subsequent to the addition of the agglomerating agent to the sodium tripolyphosphate.

11 Claims, No Drawings

AGGLOMERATION PROCESS FOR MAKING GRANULAR DETERGENTS

BACKGROUND OF THE INVENTION

This invention relates to a process for making a granular detergent product and the product of the process. More particularly, the invention relates to a process for preparing detergent compositions which are useful in automatic dishwashing machines.

Detergent compositions comprising, in combination, alkaline salts such as sodium silicate and sodium carbonate, an alkaline polyphosphate such as sodium tripolyphosphate, a surfactant and a chlorine containing compound that provides hydrochlorite ion in solution have particular utility for machine dishwashing. The formulation of such compositions made of agglomerates of the ingredients has been generally accomplished by the addition of an aqueous sodium silicate solution and liquid surfactants to a mixture of dry ingredients. Compositions prepared in such manner, however, are characterized by a tendency to cake in their cartons during storage and can also have a tendency to cake in the dispenser cups of dishwashing machines. A number of process modifications have been suggested to control the agglomeration process and reduce the caking tendency of detergent compositions prepared using silicate solutions and liquid surfactants as agglomerating agents. U.S. Pat. No. 2,895,916 discloses an order of addition in which the chlorine containing compound, chlorinated trisodium phosphate, is added to the composition only after the aqueous silicate has been added to the polyphosphate. The benefit is said to result from a more rapid hydration of the sodium tripolyphosphate in the absence of chlorinated trisodium phosphate. U.S. Pat. No. 3,741,904 discloses the preparation of a protected granule by addition of an aqueous solution of a nonionic surfactant of dry components including polyphosphates before addition of a silicate solution.

U.S. Pat. Nos. 3,247,118; 3,520,815; 3,600,317; and 3,888,781 also disclose the effect of process variations such as order of ingredient addition on the physical characteristics of a granular detergent product.

Typical automatic dishwashing product compositions contain from about ½% to about 3% of nonionic surfactants, generally in combination with a suds control agent. As disclosed in copending commonly assigned U.S. patent applications Ser. Nos. 849,132 and 902,577, incorporated herein by reference, the use of relatively higher surfactant levels is particularly beneficial in compositions containing less than about 35% sodium tripolyphosphate. In the conventional process of agglomerating sodium tripolyphosphate with aqueous sodium silicate solutions, it is convenient and satisfactory to spray on or otherwise add a liquid nonionic surfactant at any time during the agglomeration process. It has been found, however, that addition of levels of a liquid alkoxylated nonionic surfactant above about 4% in the conventional manner results in either a complete inability to produce the product or in unacceptable product physical properties, particularly with respect to carton caking after exposure to elevated temperatures or caking in dishwashing machine dispenser cups. The physical properties of an agglomerated granular detergent composition containing sodium tripolyphosphate is closely related to the complex hydration characteristics of sodium tripolyphosphate which is in turn dependent on particle size, water content and temperature conditions during manufacture.

A so-called Form I is produced if the process of manufacture includes a relatively high temperature calcination step. A Form II results when lower temperatures are employed. Form I is characterized by relatively rapid hydration characteristics. Form II, particularly in the absence of any substantial level of Form I material is slow to hydrate, but has a greater immediate solubility. Commercially available sodium tripolyphosphate is generally a mixture of Form I and Form II. U.S. Pat. Nos. 2,622,068; 2,961,409 and 2,961,410, incorporated herein by reference disclose the characteristics of Form I and Form II sodium tripolyphosphate in the manufacture of spray-dried detergents.

The processes known in the prior art have not proven to be entirely satisfactory for the production of agglomerated granular detergents containing relatively high levels (i.e., from about 4% to about 20%) of alkoxylated nonionic surfactants, particularly when the surfactant is liquid at ambient temperatures and more particularly for compositions containing less than about 35% sodium tripolyphosphate on an anhydrous basis.

It has now been found that an agglomeration process for producing detergent compositions containing at least about 10% sodium tripolyphosphate, from about 4% to about 20% of an alkoxylated nonionic surfactant, an alkali metal silicate and optionally a compound providing hypochlorite ions in aqueous solution can be optimized if part of the nonionic surfactant is added to the tripolyphosphate and part is added to dry ingredients other than polyphosphate.

Accordingly, it is an object of this invention to produce agglomerated granular detergent compositions containing from about 4% to about 20% of an alkoxylated nonionic surfactant with improved physical properties.

Other objects and advantages will be apparent from the following description and examples.

SUMMARY OF THE INVENTION

This invention comprises a process for preparing an agglomerated granular detergent composition comprising by weight on an anhydrous basis at least about 10%, preferably from about 20% to about 50% sodium tripolyphosphate, from about 50% to about 96% of inorganic materials selected from the group consisting of alkali metal polyphosphates inclusive of the sodium tripolyphosphate, orthophosphates, chlorinated orthophosphates, silicates, carbonates, sulfates, acetates and mixtures thereof and from about 4% to about 20% of an alkoxylated nonionic surfactant, wherein with agglomerating agent is an alkali metal silicate solution having an average $SiO_2$:$M_2O$ weight ratio of from about 1.6 to about 3.3, M being an alkali metal, said process comprising the addition of one portion of the surfactant to one or more dry ingredients other than a major part of the sodium tripolyphosphate and the addition of another portion of the surfactant to the major part of the sodium tripolyphosphate concurrent with or subsequent to the addition of the agglomerating agent to said sodium tripolyphosphate.

The present invention also comprises the granular detergent compositions characterized by good physical properties which are made by the process.

DETAILED DESCRIPTION OF THE INVENTION

The process of the invention is carried out in apparatus suitable for the mixing of dry particulate components and adapted so that liquid components can be sprayed on, or otherwise added to, a bed or falling curtain of one or more particulate components during the mixing operation. Any suitable mixing device such as an inclined pan agglomerator, a rotating drum or any other vessel with suitable means of agitation may be used. Methods of agitating, mixing and agglomerating particulate components are well-known to those skilled in the art. The apparatus may be designed or adapted for either continuous or batch operation so long as the essential process steps can be achieved.

Optional process steps include screening of particulate materials before processing, screening or grinding the final composition to any desired particle size, and allowing the final composition to come to equilibrium with respect to temperature and hydration before packing into cartons. Although it is an essential aspect of the invention that a portion of the surfactant, preferably at least about 50% and most preferably at least about 65%, is added to dry ingredients not comprising the major portion of the alkali metal polyphosphate.

In the agglomeration process of the present invention a relatively rapid, but controlled hydration of the anhydrous sodium tripolyphosphate is desirable. It is also desirable to achieve hydration equilibrium before packing product in cartons. Too rapid a hydration, however, can result in a temperature rise which retards agglomeration and can result in product deteriortion, e.g., breakdown of compounds that provide hypochlorite ion in solution. The process of the invention controls hydration rate.

The process and product of this invention apply to granular detergent compositions comprising four essential ingredients: (1) sodium tripolyphosphates; (2) alkali metal silicates; (3) an alkoxylated nonionic surfactant and (4) dry ingredients other than sodium tripolyphosphate.

The Sodium Tripolyphosphate

The detergent compositions made by the process of the invention contain sodium tripolyphosphate at a level of at least about 10%, preferably from about 20% to about 50%, on an anhydrous basis. Other polyphosphates can be incorporated but sodium tripolyphosphate ($Na_5P_3O_{10}$) is preferred because of its stability and the fact that it does not form insoluble salts with the calcium or magnesium ions present in water or soils.

The Alkali Metal Silicate

The compositions made by the process of this invention contain alkali metal silicates generally at a level of from about 5% to about 25% on an anhydrous weight basis. Aqueous alkali metal silicate solutions typically containing from about 50% to about 75%, preferably from about 55% to about 65%, water are used as agglomerating agents. Particularly preferred is a sodium silicate having a weight ratio of $SiO_2$:$Na_2O$ of from about 1.6 to about 3.3, most preferably from about 2 to about 3.2. Lower ratio silicates which are relatively more alkaline provide good cleaning performance but in order to provide protection to materials such as aluminum and china, it is desirable to have at least 10% and up to 75% of the $SiO_2$ present at a $SiO_2$:$Na_2O$ ratio above 3.0. It is possible to add all of the silicate in the form of aqueous solutions typically containing from about 35% to about 45% silicate solids but a portion may be part of the dry mix as will be apparent in the examples.

The Optional Hypochlorite Ion Compound

The source of hypochlorite ion is a chlorine bleach component, a compound which contains chlorine in active form. The ability of a compound to provide hypochlorite ion in solution is generally measured as "available chlorine". The available chlorine reflects the method of producing a inorganic hypochlorite (e.g., $2NaOH + Cl_2 \rightarrow NaOCl + NaCl + H_2O$). Available chlorine is the chlorine liberated by acidification of a solution of hypochlorite ions and at least a molar equivalent amount of chloride ions. The usual analytical method of determining available chlorine is addition of an excess of an iodide salt and titration of liberated free iodine with a reducing agent. The compositions provided by the process of this invention preferably have hypochlorite ion producing compounds in an amount sufficient to provide available chlorine equal to from about ½% to about 4% by weight of the composition. This corresponds to about 0.52% to 4.2% by weight of sodium hypochlorite.

The preferred source of available chlorine is chlorinated trisodiumphosphate.

The term "chlorinated trisodium phosphate" designates a composition consisting of trisodium phosphate and sodium hypochlorite in intimate association in the crystalline form. A nominal formula is $4(Na_3PO_4 \cdot 11H_2O) \cdot NaOCl$. Chlorinated trisodium phosphate typically contains from 1% to 5% available chlorine and can be prepared by the methods of U.S. Pat. Nos. 1,555,474 or 1,965,304 or modifications thereof, incorporated herein by reference.

Although the preferred source of available chlorine is chlorinated trisodium phosphate, other materials which can be used are sodium and potassium dichlorocyanurates, dichlorocyanuric acid; 1,3-dichloro-5,5-dimethyl hydantoin; N,N'-dichlorobenzoylene urea; paratoluene sulfondichloroamide; trichloromelamine; N-chloroammeline; N-chlorosuccinimide; N,N'-dichloroazodicarbonamide; N-chloroacetyl urea; N,N'-dichlorobiuret; chlorinated dicyandiamide; sodium hypochlorite; calcium hypochlorite; and lithium hypochlorite. Of the materials other than chlorinated trisodium phosphate, alkali metal dichlorocyanurates are preferred for effectiveness, stability and availability. Potassium dichlorocyanurate in the range of about 0.85% to 6.8% by weight of the composition is equivalent to 0.5% to 4% available chlorine.

The Surfactant

The level of the surfactant is from about 4% to about 20%, preferably from about 6% to about 10%, by weight of the composition. The surfactant comprises an alkoxylated nonionic surfactant and preferably the composition is essentially free of sulfonated or sulfated anionic surfactants.

Examples of alkoxylated nonionic surfactants include:

(1) the condensation product of 1 mole of a saturated or unsaturated, straight or branched chain, alcohol or fatty acid containing from about 10 to about 20 carbon atoms with from about 4 to about 50 moles of ethylene oxide. Specific examples of such compounds include a condensation product of 1 mole of coconut fatty acid or tallow fatty acid with 10 moles of ethylene oxide; the condensation of 1 mole of oleic acid with 9 moles of ethylene oxide; the condensation product of 1 mole of stearic acid with 25 moles of ethylene oxide; the condensation product of 1 mole of tallow fatty alcohols with about 9 moles of ethylene oxide; the condensation product of 1 mole of oleyl alcohol with 10 moles of ethylene oxide; the condensation product of 1 mole of $C_{19}$ alcohol and 8 moles of ethylene oxide; and the condensation product of one mole of $C_{18}$ alcohol and 9 moles of ethylene oxide.

The condensation product of a fatty alcohol containing from 17 to 19 carbon atoms, and being substantially free of chain lengths above and below these numbers, with from about 6 to about 15 moles, preferably 7 to 12 moles, most preferably 9 moles, of ethylene oxide is particularly preferred, especially when capped with a low molecular weight ($C_{1-5}$) acid or alcohol moiety, so as to minimize or eliminate the need for a suds-suppressing agent. Suds-suppressing agents tend to reduce cleaning performance.

(2) Polyethylene glycols having molecular weights of from about 1,400 to about 30,000, e.g., 20,000 9,500; 7,500; 6,000; 4,500; 3,400; and 1,450. All of these materials are waxlike solids which melt between 110° F. and 200° F.

(3) The condensation products of 1 mole of alkyl phenol wherein the alkyl chain contains from about 8 to about 18 carbon atoms and from about 4 to about 50 moles of ethylene oxide. Specific examples of these nonionics are the condensation products of 1 mole of decylphenol with 40 moles of ethylene oxide; the condensation product of 1 mole of dodecyl phenol with 35 moles of ethylene oxide; the condensation product of 1 mole of tetradecylphenol with 25 moles of ethylene oxide; the condensation product of 1 mole of hectadecylphenol with 30 moles of ethylene oxide, etc.

(4) Polyoxypropylene, polyoxyethylene condensates having the formula $HO(C_2H_4O)_x(C_3H_6O)_y(C_2H_4O)_xH$ where y equals at least 15 and $(C_2H_4O)_{x+x}$ equals 20% to 90% of the total weight of the compound and the molecular weight is from about 2,000 to about 10,000, preferably from about 3,000 to about 6,000. These materials are, for example, the Pluronics which are well known in the art.

(5) The compounds of (1) which are capped with propylene oxide, butylene oxide and/or short chain alcohols and/or short chain fatty acids, e.g., those containing from 1 to about 5 carbon atoms, and mixtures thereof.

Preferred surfactants are those having the formula $RO—(C_2H_4O)_xR^1$ wherein R is an alkyl or alkylene group containing from 17 to 19 carbon atoms, x is a number from about 6 to about 15, preferably from about 7 to about 12, and $R^1$ is selected from the group consisting of: preferably, hydrogen, $C_{1-5}$ alkyl groups, $C_{2-5}$ acyl groups and groups having the formula $—(C_yH_{2y}O)_nH$ wherein y is 3 to 4 and n is a number from 1 to about 4.

Also preferred are the low sudsing compounds of (4), the other compounds of (5), and the $C_{17-19}$ materials of (1) which have a narrow ethoxy distribution.

In addition to the above mentioned surfactants, other suitable surfactants can be found in the disclosure of U.S. Pat. Nos. 3,544,473, 3,630,923, 3,888,781 and 4,001,132, all of which are incorporated herein by reference.

Additional Dry Ingredients

Dry ingredients other than sodium tripolyphosphate are utilized to absorb a portion of the alkoxylated nonionic surfactant.

The process and composition of the invention can utilize alkali metal, particularly sodium carbonate or orthophosphate to provide the alkalinity reserve needed for optimum cleaning performance in a composition with from about 10% to about 35% sodium tripolyphosphate. The preferred source of available chlorine, chlorinated trisodium phosphate, has a dual function when used in the compositions of the invention at a preferred level of from about 15% to about 40% by weight. Nonchlorinated alkali metal orthophosphates can be used when an organic chlorine bleach such as sodium or potassium dichlorocyanurate is the source of hypochlorite ions.

Alkali metal carbonates, particularly sodium carbonate, can be present in the compositions at levels up to about 50%, preferably from about 5% to about 15% by weight. In addition to the alkali metal silicate solutions used as an agglomerating agent anhydrous alkali metal silicates and granular or powdered hydrated alkali metal silicates can be used in the process and compositions of the invention. At least about 10%, preferably at least about 15%, of dry ingredients other than sodium tripolyphosphate are necessary in the process of the invention. Anhydrous sodium carbonate and granular or powdered hydrated sodium silicate are particularly preferred. A portion, preferably at least about 50%, most preferably at least about 65%, of the total surfactant is mixed with and absorbed into dry components other than the principal part of the sodium tripolyphosphate. A second portion, typically the remainder, preferably from about 15% to about 35%, of the surfactant is added to the sodium tripolyphosphate concurrent with or subsequent to the addition of the aqueous silicate solution. The rate of hydration of the polyphosphate can be controlled by the presence of the surfactant. Absence of surfactant at this step provides rapid hydration. As the portion of surfactant added concurrent with the aqueous silicate is increased, the rate of hydration is decreased, particularly if the surfactant is added relatively early during the aqueous silicate addition. A separate portion of dry ingredients can be blended with the agglomerates to provide the final granular composition. In a preferred embodiment of the present invention a pre-mix of all or a portion of the dry ingredients other than sodium tripolyphosphate and chlorinated trisodium phosphate and constituting at least about 10% by weight of the detergent composition is mixed with from about 50% to about 90%, preferably with from about 65% to about 85%, of the surfactant. The resultant mealy granules are mixed with anhydrous sodium tripolyphosphate. The aqueous sodium silicate solution agglomerating agent is then added with the remainder of the surfactant. Optionally, a material such as chlorinated trisodium phosphate providing hypochlorite ions in aqueous solution is also added.

Other Optional Ingredients

In addition to the above ingredients it can be desirable, if the product sudses too much, to incorporate one of the many suds-suppressing ingredients disclosed in the above mentioned patents, which have been incorporated by reference, at a level of from about 0.001% to about 10%, preferably from about 0.05% to about 3%.

The preferred suds suppressing materials are mono- and distearyl acid phosphates, the self-emulsified siloxane suds-suppressors of pending U.S. patent application Ser. No. 841,078, filed Oct. 11, 1977, by T. W. Gault and Edward John McGuire, Jr. and mixtures thereof.

Similarly, there should preferably be no more than about 10%, of organic sequestering builders such as citrates and nitrilotriacetates in the compositions. The presence of organic builders tends to hurt the performance of these compositions by leaving visible spots and filming on glassware. The polyphosphate builders are relatively free of these deficiencies.

China protecting agents including aluminosilicates, aluminates, etc., can be present in amounts up to about 5%, preferably from about 0.2% to about 2%.

Filler materials to control product physical characteristics can also be present including sucrose, sucrose esters, sodium chloride, sodium sulfate, etc., in amounts up to about 60%, preferably not more than about 30%.

Hydrotrope materials such as sodium benzene sulfonate, sodium toluene sulfonate, sodium cumene sulfonate, etc., can be present in minor amounts, but, as with other organic materials, their presence is normally minimized.

Dyes, perfumes, crystal modifiers and the like can also be added in minor amounts.

As used herein, all percentages, parts and ratios are by weight unless otherwise stated.

In a preferred practice of the process on the present invention, from about 2% to about 20% of a hydratable salt or a hydratable salt forming material is incorporated in the aqueous alkali metal silicate solution agglomerated agent added to the anhydrous sodium tripolyphosphate. This preferred practice is disclosed in the commonly assigned, concurrently filed patent application U.S. Ser. No. 932,107 of Davis et al filed Aug. 9, 1978, incorporated herein by reference.

In an embodiment of the present invention the sodium tripolyphosphate may be comprised of from 0% to 100% of granular sodium tripolyphosphate and from 100% to 0% powdered sodium tripolyphosphate, such mixture having a particle size range from one which has a Thru 100 Tyler mesh minimum of 90% (typical of powdered material) to one which has a Thru 100 Tyler mesh of a maximum of 5% (typical of granular material).

In a preferred embodiment of this invention the phosphate mixture can be comprised of from about 20% to 80% granular sodium tripolyphosphate and from about 80% to 20% powdered sodium tripolyphosphate, such mixture having a particle size range of from about 70% Thru 100 Tyler mesh to one which has about 20% Thru 100 Tyler mesh. Surprisingly, a combination of granular and powdered sodium tripolyphosphate that provides the preferred particle size distribution results in an agglomerated granular detergent composition that is resistant to caking in cartons after storage at elevated temperatures and has a reduced tendency to cake in the dispenser cups of automatic dishwashing machines. The use of at least about 20% of granular sodium tripolyphosphate based on the total sodium tripolyphosphate provides resistance to dispenser cup caking. Powdered sodium tripolyphosphate is beneficial in providing resistance to carton caking relative to the granular material but its exclusive use can be detrimental to dispenser cup caking unless care is taken to achieve good agglomeration.

The following Examples illustrate the invention and facilitate its understanding.

Comparative Example I

With continuous mixing, the following ingredients were added to a ribbon mixer.

(a) 26.5 parts anhydrous sodium tripolyphosphate (b) 10 parts anhydrous sodium carbonate (c) 6 parts hydrated sodium silicate (81% solids; $SiO_2$:$Na_2O$ weight ratio=2.4:1)

(d) 0.1 part sodium aluminate (e) 15.7 parts aqueous sodium silicate (44% solids 2.0 ratio)

(f) 15.7 parts aqueous sodium silicate (37.5% solids 3.2 ratio)

(g) 5.0 parts Pluridot HA-430 [1]nonionic surfactant (h) 2.5 parts Pluridot HA-433 [2]nonionic surfactant (i) 22.0 parts chlorinated trisodium phosphate 1 BASF-Wyandotte Corp.—A polyethylene oxide—polypropylene oxide copolymer based on a triol.

2 BASF-Wyandotte Corp.—A polyethylene oxide—polypropylene oxide copolymer containing a monostearyl acid phosphate suds suppressor.

The surfactants (g) and (h) were sprayed on the dry ingredients (a), (b), (c) and (d) concurrent to the spray addition of a mixture of the liquid silicate solutions (e) and (f). The mixture of silicate solutions contained 3.5 parts of the total sodium tripolyphosphate in (a).

The dry chlorinated trisodium phosphate (i) was also added during the spray cycle.

Agglomeration was unsatisfactory. The mixture became wet and pasty and could not be processed.

A similar unsatisfactory agglomeration resulted when the anhydrous granular sodium tripolyphosphate was replaced with anhydrous powdered sodium tripolyphosphate.

EXAMPLE II

Using the same ingredients and levels as in Example I, an agglomerated granule detergent composition was produced by the following process.

A pre-mix of ingredients (b), (c), (d) and (g) was made in a ribbon mixer by spraying the liquid surfactant (g) on the dry ingredients. The resultant mealy granules were mixed with the anhydrous granular sodium tripolyphosphate (a). The surfactant portion (h) was sprayed on the mixture after addition of the aqueous sodium silicate solutions (e) and (f). The dry chlorinated trisodium phosphate (i) was added at approximately the midpoint of the aqueous silicate addition.

A satisfactory agglomerated granular detergent composition was produced, but the product had a tendency to cake in cartons on exposure to 90° F. The product was satisfactory in its resistance to caking in machine dispenser cups.

The process was repeated using anhydrous powdered sodium tripolyphosphate. A satisfactory agglomerated granular detergent composition was produced, but the product had a tendency to cake in machine dispenser cups. Carton caking was satisfactory.

EXAMPLE III

The processes of Example II were repeated with the liquid surfactant portion (h) sprayed on the ingredients in the mixer starting at about the midpoint of the aqueous silicate addition and finishing when approximately 90% of the aqueous silicate had been added.

With both granular and powdered sodium tripolyphosphate, the resultant products had good resistance to carton and dispenser cup caking.

EXAMPLE IV

The process of Example II was repeated using a mixture of 25% granular sodium tripolyphosphate and 75% powdered sodium tripolyphosphate. The resultant product had good resistance to carton caking and excellent resistance to dispenser cup caking.

Carton Caking Evaluation

Product from each of the completed examples was packed in 35 oz. polyethylene laminated aluminium foil overwrapped cartons and stored at 90° F. At intervals of one week, cartons were opened and subjected to a pour test evaluation.

The resistance to carton caking was measured after storage time and conditions as indicated in the table below. A mechanized pouring testing device was used to evaluate the samples. The device rotates opened cartons through a 100° arc, stops briefly and then returns the carton to an upright position. This procedure is repeated to determine a "free pour" grade. Following the pour test cycle, cartons with any remaining product are subjected to four "shake-pour" cycles which repeat the 100° arc pouring of the carton with a gentle continuous lateral shaking action. This procedure provides a "total pour" grade.

| | Carton Caking Evaluation Free Pour/Total Pour | | |
|---|---|---|---|
| Comparative | 90° F. Storage | | |
| Example I | 1 week | 2 weeks | 3 weeks |
| granular STP | — | product not produced | — |
| powdered STP | — | product not produced | — |
| Example II | | | |
| granular STP | 10/42 | 11/16 | 8/11 |
| powdered STP | 38/99 | 89/100 | 35/51 |
| Example III | | | |
| granular STP | 80/100 | 72/100 | 60/100 |
| powdered STP | 99/100 | 33/99 | 52/96 |
| Example IV | | | |
| 25/75 mixture (granular/ powdered STP) | 64/100 | 48/100 | 65/100 |

Dispenser Cup Evaluation

This test is a measure of the ability of a granular detergent product to be washed out of a automatic dishwashing machine dispenser cup by the action of a water spray. The grading standards are visual with a grade of 10 indicating essentially no removal of product and a grade of 0 indicating complete removal of product.

| | Dispenser Cup Caking | | | |
|---|---|---|---|---|
| | 3 ml | 5 ml | 7 ml | |
| Example I | | | | |
| granular STP | — | product not produced | — | |
| powdered STP | — | product not produced | — | |
| Example II | | | | |
| granular STP | 4.7 | 0.5 | 0.5 | (good) |
| powdered STP | 7.5 | 6.0 | 6.0 | (poor) |
| Example III | | | | |
| granular STP | 3.5 | 0.5 | 0.5 | (good) |
| powdered STP | 4.4 | 1.3 | 1.1 | (good) |
| Example IV | | | | |
| 25/75 mixture (granular/ powdered STP) | 3.0 | 0.7 | 0.5 | (good) |

EXAMPLE V 35 parts of chlorinated trisodium phosphate were loaded into a rotating drum mixer. 5.0 parts of Pluradot HA-433 nonionic surfactant were sprayed on the chlorinated trisodium phosphate with continuous mixing. After absorption of the surfactant, 23.5 parts of anhydrous powdered sodium tripolyphosphate and 6.0 parts of granular hydrated sodium silicate (81% solids with $SiO_2$:$Na_2O$ ratio of 2.4) were added. 31.4 parts of an aqueous sodium silicate solution (15.7 parts 2.0 ratio, 44% solids and 15.7 parts 3.2 ratio, 37.5% solids) and 2.5 parts of Pluradot HA-433 are sprayed on the dry mixture to form an agglomerated detergent composition.

A second detergent composition was prepared by the same process except that the aqueous sodium silicate solution contained 3.4 parts of the total sodium tripolyphosphate (10% of the silicate solution by weight).

EXAMPLE VI 6.0 parts of granular hydrated sodium silicate (8% solids, 2.4 ratio) were added to a rotating drum mixer and 2.5 parts Pluradot HA-433 were sprayed on and absorbed into the silicate with continuous mixing. 23.5 parts of powdered anhydrous sodium tripolyphosphate were added. 16.9 parts of an aqueous sodium silicate solution (9.2 parts 2.0 ratio, 44% solids and 7.7 parts 3.2 ratio, 37.5% solids) and 5.0 parts Pluradot HA-433 were sprayed on the mixture of dry ingredients. When approximately 70% of the aqueous silicate had been added, 35.0 parts of chlorinated trisodium phosphate were added.

A second detergent composition was prepared by the same process except that 1.88 parts of sodium tripolyphosphate was added to the aqueous sodium silicate solution.

EXAMPLE VII 10.0 parts anhydrous sodium carbonate and 22.0 parts chlorinated trisodium phosphate were added to a rotating drum mixer. With continuous mixing 5.0 parts of Pluradot HA-433 were sprayed on and absorbed into the mixture. 26.0 parts of powdered anhydrous sodium tripolyphosohate and 6.0 parts of granular hydrated sodium silicate (81% solids, 2.4 ratio) were added and 31.4 parts of an aqueous sodium silicate solution (15.7 parts 2.0 ratio, 44% solids and 15.7 parts 3.2 ratio, 37.5% solids) and 2.5 parts of Pluradot HA-433 were sprayed on the mixture of dry ingredients to form an agglomerated detergent composition.

A second detergent compostion was prepared by the same process except that 3.5 parts of powdered anhydrous sodium tripolyphosphate was added to the aqueous sodium silicate solution.

Compositions of this example were also prepared in a ribbon mixer.

The compositions of Examples V, VI, and VII were packed into 35 oz. polyethylene laminated, aluminum foil overwrapped cardboard cartons. As made all products had satisfactory physical properties. The compositions were stored at 90° F. and evaluated at weekly intervals for carton caking.

| Percent Product Removed (Free Pour/Total Pour) Storage Temperature (° F.) Storage Time (Weeks) | 90° F. | | |
|---|---|---|---|
| Product | 1 week | 2 weeks | 3 weeks |
| Example V | | | |
| No polyphosphate in silicate solution | | | |
| Batch 1 | 70/100 | — | 35/50 |
| Batch 2 | 62/77 | 16/46 | 18/26 |
| 10% polyphosphate in silicate solution | | | |
| Batch 1 | 96.100 | 95/100 | 47/100 |
| Batch 2 | 36/67 | 27/58 | 16/26 |
| Example VI | | | |
| No polyphosphate in silicate solution | 0/84 | 3/34 | 6/15 |
| 10% of polyphosphate in silicate solution | 41/100 | 23/62 | 35/97 |
| Example VII | | | |
| No polyphosphate in silicate solution | | | |
| Rotating Drum Mixer | 90/100 | 27/57 | 22/41 |
| Ribbon Mixer | 57/100 | 55/68 | 23/72 |
| 10% of polyphosphate in silicate solution | | | |
| Rotating Drum Mixer | 89.100 | 28/72 | 55/84 |
| Ribbon Mixer | 80/100 | 65/95 | 43/90 |

We claim:

1. A process for preparing an agglomerated granular detergent composition comprising by weight on an anhydrous basis at least about 10% sodium tripolyphosphate, from about 50% to about 96% of inorganic materials selected from the group consisting of alkali metal polyphosphates inclusive of the sodium tripolyphosphate, orthophosphates, chlorinated orthophosphates, silicates, carbonates, sulfates, acetates and mixtures thereof and from about 4% to about 20% of an alkoxylated nonionic surfactant, wherein the agglomerating agent is an alkali metal silicate solution having an average $SiO_2$:$M_2O$ weight ratio of from about 1.6 to about 3.3, M being an alkali metal, said process comprising the addition of one portion of the surfactant to one or more dry ingredients other than a major part of the sodium tripolyphosphate and the addition of another portion of the surfactant to the major part of the sodium tripolyphosphate concurrent with or subsequent to the addition of the agglomerating agent to said sodium tripolyphosphate.

2. The process of claim 1 wherein the portion of surfactant added to said dry ingredients other than the major part of the sodium tripolyphosphate comprises at least about 50% of the surfactant in the detergent composition.

3. The process of claim 2 wherein the surfactant comprises on a weight basis from about 5% to about 10% of the detergent composition.

4. The process of claim 1, 2 or 3 wherein the detergent composition comprises a material providing hypochlorite ion in aqueous solution.

5. The process of claim 1, 2 or 3 wherein the dry ingredients other than the major part of the sodium tripolyphosphate comprises a material selected from the group consisting of sodium carbonate, sodium silicate, chlorinated trisodium phosphate and mixtures thereof.

6. The process of claim 3 wherein the detergent composition comprises on an anhydrous weight basis from about 15% to about 40% chlorinated trisodium orthophosphate, from about 5% to about 15% sodium carbonate and from about 10% to about 50% sodium tripolyphosphate.

7. The process of claim 6 wherein the sodium tripolyphosphate has a particle size distribution such that from about 90% to about 5% passes through a 100 Tyler mesh screen.

8. The process of claim 7 wherein the sodium tripolyphosphate has a particle size distribution such that from about 70% to about 20% passes through a 100 Tyler mesh screen.

9. The process of claim 6, 7 or 8 wherein from about 15% to about 35% of the total surfactant is added to said sodium tripolyphosphate or a mixture comprising sodium tripolyphosphate concurrent with the addition of said agglomerating agent.

10. In a process for preparing an agglomerated granular detergent composition comprising by weight on an anhydrous basis at least about 10% sodium tripolyphosphate, from about 50% to about 96% of inorganic materials selected from the group consisting of alkali metal polyphosphates inclusive of the sodium tripolyphosphate, orthophosphates, chlorinated orthophosphates, silicates, carbonates, sulfates, acetates and mixtures thereof and from about 4% to about 20% of an alkoxylated nonionic surfactant, wherein the agglomerating agent is an alkali metal silicate solution having an average $SiO_2$:$M_2O$ weight ratio of from about 1.6 to about 3.3, M being an alkali metal, the improvement that comprises the addition of one portion of the surfactant to one or more dry ingredients other than a major part of the sodium tripolyphosphate and the addition of another portion of the surfactant to the major part of the sodium tripolyphosphate concurrent with or subsequent to the addition of the agglomerating agent to said sodium tripolyphosphate.

11. An agglomerated granular detergent composition prepared according to the process of claim 1.

* * * * *